United States Patent
Kang et al.

(10) Patent No.: US 9,929,840 B2
(45) Date of Patent: *Mar. 27, 2018

(54) METHOD AND APPARATUS FOR COOPERATIVE TRANSMISSION IN MULTI-NODE SYSTEM

(71) Applicant: LG ELECTRONICS INC., Seoul (KR)

(72) Inventors: Ji Won Kang, Anyang-si (KR); Jin Young Chun, Anyang-si (KR); Moon Il Lee, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,734

(22) Filed: Oct. 7, 2015

(65) Prior Publication Data
US 2016/0036575 A1 Feb. 4, 2016

Related U.S. Application Data (63) Continuation of application No. 13/310,641, filed on Dec. 2, 2011, now Pat. No. 9,191,157.
(Continued)

(30) Foreign Application Priority Data

Jun. 13, 2011 (KR) .................. 10-2011-0056674

(51) Int. Cl.
| | |
|---|---|
| H04L 1/00 | (2006.01) |
| H04L 5/00 | (2006.01) |
| H04B 7/022 | (2017.01) |
| H04W 88/08 | (2009.01) |
| H04B 7/06 | (2006.01) |

(52) U.S. Cl.
CPC .......... H04L 5/0048 (2013.01); H04B 7/022 (2013.01); H04L 1/0026 (2013.01);
(Continued)

(58) Field of Classification Search
CPC ... H04L 5/0048; H04L 1/0077; H04L 1/0026; H04B 7/022; H04B 7/065; H04B 7/0643; H04W 88/085
See application file for complete search history.

(56) References Cited

U.S. PATENT DOCUMENTS 7,586,836 B2 9/2009 Park et al.
2009/0154583 A1* 6/2009 Lee ................. H04L 5/0007
375/260

(Continued)

*Primary Examiner* — Andrew Lai
*Assistant Examiner* — Chuong M Nguyen
(74) *Attorney, Agent, or Firm* — Lee Hong Degerman Kang & Waimey (57) ABSTRACT

A method of performing cooperative transmission in a multi-node system including a Base Station (BS) and a plurality of nodes controlled by the BS is provided. The method comprises: transmitting a first signal generated using a first cell identifier (ID) from the plurality of nodes; and transmitting a second signal generated using a second cell ID from at least one of the plurality of nodes, wherein the first cell ID is identical with a cell ID used by the BS, and the second cell ID is different from the first cell ID.

12 Claims, 7 Drawing Sheets

Related U.S. Application Data (60) Provisional application No. 61/419,254, filed on Dec. 3, 2010.

(52) U.S. Cl.
CPC ............ H04L 1/0077 (2013.01); H04B 7/065 (2013.01); H04B 7/0643 (2013.01); H04W 88/085 (2013.01)

(56) References Cited

U.S. PATENT DOCUMENTS

| | | | |
|---|---|---|---|
| 2009/0316654 A1* | 12/2009 | Prakash | ............ H04W 36/0088 370/331 |
| 2009/0316659 A1 | 12/2009 | Lindoff et al. | |
| 2009/0327391 A1* | 12/2009 | Park | ....................... H04W 8/005 709/201 |
| 2010/0189058 A1* | 7/2010 | Kawamura | ........... H04L 5/0026 370/329 |
| 2010/0323718 A1 | 12/2010 | Jen | |
| 2011/0075624 A1 | 3/2011 | Papasakellariou et al. | |
| 2011/0098074 A1 | 4/2011 | Seo et al. | |
| 2011/0170516 A1 | 7/2011 | Hu et al. | |
| 2011/0256868 A1* | 10/2011 | Nogami | ............... H04J 11/0069 455/435.1 |
| 2011/0286411 A1 | 11/2011 | Kim et al. | |
| 2012/0033643 A1 | 2/2012 | Noh et al. | |
| 2012/0087273 A1 | 4/2012 | Koo et al. | |
| 2012/0108270 A1* | 5/2012 | Kazmi | .................. H04W 64/00 455/456.5 |

* cited by examiner

METHOD AND APPARATUS FOR COOPERATIVE TRANSMISSION IN MULTI-NODE SYSTEM

CROSS REFERENCE TO RELATED APPLICATIONS

This application is a continuation of U.S. application Ser. No. 13/310,641, filed on Dec. 2, 2011, now U.S. Pat. No. 9,191,157, which claims the benefit of earlier filing date and right of priority to Korean Application No. 10-2011-0056674, filed on Jun. 13, 2011 and U.S. Provisional Application No. 61/419,254, filed on Dec. 3, 2010, the contents of which are all incorporated by reference herein in their entireties.

BACKGROUND

1. Technical Field

The present invention relates to wireless communication and, more particularly, to a method and apparatus for performing cooperative transmission in a multi-node system.

2. Related Art

In a current wireless communication environment, the required amount of data for a communication network is rapidly increasing according to Machine-to-Machine (M2M) communication and the appearance and spread of various devices, such as smart phones and tablet PCs which require a great amount of data transmission. In order to satisfy a great amount of data transmission, communication technology is being developed into carrier aggregation technology for efficiently using a greater frequency band, cognitive radio technology, multi-antenna technology for increasing the data capacity within a limited frequency, multi-base station cooperation technology, and so on.

Furthermore, a wireless communication environment is evolving into an increase in the density of nodes which may access user peripheries. Here, the nodes refer to antennas or a group of antennas which are spaced apart from one another at specific intervals in a Distributed Antenna System (DAS). In the present invention, however, the nodes are not limited to the above meaning, but may be used in a broad sense. The node may include not only a macro base station in a cellular network, but also a device having a small coverage, such as a pico cell base station (PeNB), a home base station (HeNB), a Remote Radio Head (RRH), a Remote Radio Unit (RRU), a relay station, a distributed antenna, a WiFi Access Point (AP), a femto AP, or a pico AP.

A wireless communication system including a high density of nodes may have better system performance through cooperation between the nodes. That is, nodes cooperating with each other have more excellent system performance than nodes not cooperating with each other, each of which is operated as an independent Base Station (BS), Advanced BS (ABS), Node-B (NB), eNode-B (eNB), and AP.

There is a need for a method and apparatus which can perform cooperative transmission by utilizing each node in a multi-node system.

SUMMARY

The present invention provides a cooperative transmission method and apparatus in a multi-node system.

An aspect of the present invention provides a method of performing cooperative transmission in a multi-node system including a Base Station (BS) and a plurality of nodes controlled by the BS. The method comprises: transmitting a first signal generated using a first cell identifier (ID) from at least one of the plurality of nodes and the BS; and transmitting a second signal generated using a second cell ID from at least one of the plurality of nodes, wherein the first cell ID is identical with a cell ID used by the BS, and the second cell ID is different from the first cell ID.

The first signal may include at least one information among system information, control information, and information related to cell selection.

The second signal may include at least one reference signal (RS) among a channel state information RS, demodulation RS, and position RS.

The method further includes: requesting, from the BS, a channel information feedback between the node transmitting the second signal and User Equipment (UE), to the UE, wherein the signal to request the channel information feedback includes the second cell ID.

The method may further include: transmitting, from the BS, a cell ID for each of the plurality of nodes and an indicator, indicating whether each of the plurality of nodes participates in the cooperative transmission, to the UE.

Some bits of the second cell ID may be identical with some bits of the first cell ID.

The method further includes: transmitting, from the BS, a message, indicating a feedback information type, to the UE if the node transmitting the second signal is plural, wherein the message to indicate the feedback information type indicates whether the BS participates in the cooperative transmission or the BS does not participate in the cooperative transmission.

The message to indicate the feedback information type may be composed of 1 bit.

The method may further include: transmitting, from the BS, information, informing the node sending the second signal, to first UE, if the node sending the second signal transmits the second signal to the first UE.

Another aspect of the present invention provides an operating method of User Equipment (UE) in a multi-node system including a Base Station (BS) and a plurality of nodes controlled by the BS. The method comprises: receiving a first signal, generated using a first cell identifier (ID), from at least one of the plurality of nodes and the BS; receiving, from the BS, a signal to request a channel information feedback for a node sending a second signal, generated using a second cell ID, and information indicating the node sending the second signal; receiving the second signal; feeding channel information, measured using the second signal, back to the BS, wherein the first cell ID is identical with a cell ID used by the BS, and the second cell ID is different from the first cell ID.

The first signal may include at least one information among system information, control information, and information related to cell selection.

The second signal may include at least one reference signal among a CSI-RS, a DM-RS, and a PRS.

The operating method further includes: receiving a message, indicating a feedback information type, from the BS if the node sending the second signal is plural, wherein the message to indicate the feedback information type indicates whether the BS participates in the cooperative transmission or the BS does not participate in the cooperative transmission.

The operating method may further include receiving information, informing the node sending the second signal, from the BS.

Yet another aspect of the present invention provides an operating method of User Equipment (UE) in a multi-node system including a Base Station (BS) and a plurality of nodes controlled by the BS, the operating method comprising: receiving a first cell identifier (ID) and a second cell ID from the BS; transmitting an uplink signal to at least one node among the plurality of nodes using the second cell ID; wherein the first cell ID is a common cell ID used by the BS and the plurality of nodes when receiving an uplink signal, and the second cell ID is a dedicated cell ID used by the at least one node of the plurality of nodes when receiving an uplink signal.

The uplink signal transmitted by the UE comprises at least one signal among a sounding reference signal, a demodulation reference signal for decoding uplink data, a signal transmitted to the at least one node through feedback channel.

Yet another aspect of the present invention provides user equipment, including a Radio Frequency (RF) unit configured to transmit and receive a radio signal and a processor coupled to the RF unit. The UE comprises: a Radio Frequency (RF) unit configured to transmit and receive a radio signal; and a processor coupled to the RF unit, wherein the processor receives a first signal, generated using a first cell identifier (ID), from a plurality of nodes, receives a signal to request a channel information feedback for a node sending a second signal, generated using a second cell ID, and information indicating the node sending the second signal from a Base Station (BS), receives the second signal, feeds channel information, measured using the second signal, back to the BS, wherein the first cell ID is identical with a cell ID used by the BS, and the second cell ID is different from the first cell ID.

DESCRIPTION OF EXEMPLARY EMBODIMENTS

The following technology may be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). The CDMA may be implemented using radio technology, such as Universal Terrestrial Radio Access (UTRA) or CDMA2000. The TDMA may be implemented using radio technology, such as Global System for Mobile communications (GSM)/General Packet Radio Service (GPRS)/Enhanced Data Rates for GSM Evolution (EDGE). The OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). The UTRA is part of a Universal Mobile Telecommunications System (UMTS). 3rd Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advance (LTE-A) is an evolution of LTE. IEEE 802.16m is an evolution of IEEE 802.16e.

Figure 1:
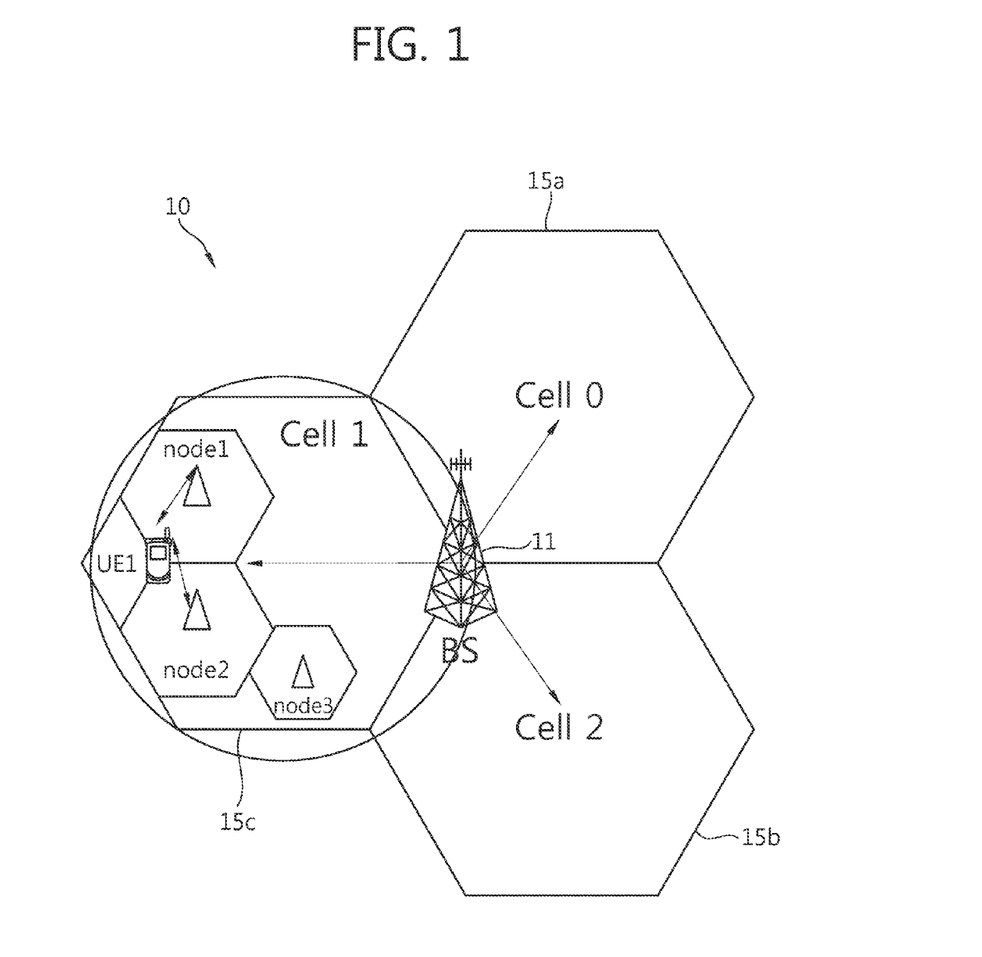
FIG. 1 shows an example of a multi-node system.

FIG. 1 shows an example of a multi-node system.

Referring to FIG. 1, a multi-node system 10 includes at least one Base Station (BS) 11 and nodes distributed within a cell. The BS 11 can provide communication service to specific geographical areas (commonly called cells) 15a, 15b, and 15c. The cell may be subdivided into a plurality of areas (called sectors). The BS 11 commonly refers to a fixed station communicating with UEs, and it may be called another terminology, such as an evolved-NodeB (eNB), a Base Transceiver System (BTS), or an access point.

A node refers to a controllable signal transceiver coupled to a BS in a wired or wireless way. The node may become a pico cell BS (PeNB), a home BS (HeNB), a Remote Radio Head (RRH), a Remote Radio Unit (RRU), a relay station, an antenna (or an antenna group), a WiFi Access Point (AP), a femto AP, a pico AP, or the like. Antennas may be distributed within a cell, but the present invention may also be applied to antennas that are concentrated. For example, the present invention may be applied to cross polarized antennas which are concentrated on and located in a BS by considering the cross polarized antennas as nodes, including vertical polarized antennas, and nodes including horizontal polarized antennas.

User Equipment (UE) may be fixed or mobile and also be called another terminology, such as a Mobile Station (MS), a User Terminal (UT), a Subscriber Station (SS), a wireless device, a Personal Digital Assistant (PDA), a wireless modem, or a handheld device.

Hereinafter, downlink (DL) means a communication link from a BS or a node to UE, and uplink (UL) means communication link from UE to a BS or a node. In downlink, a transmitter may be part of a BS or a node, and a receiver may be part of UE. In uplink, a transmitter may be part of UE, and a receiver may be part of a BS or a node.

A multi-node system can support multiple antennas. That is, a transmitter may use a plurality of transmit antennas, and a receiver may use a plurality of receive antenna. The transmit antenna refers to a physical or logical antenna used to transmit one signal or stream, and the receive antenna refers to a physical or logical antenna used to receive one signal or stream. If a transmitter and a receiver use a plurality of antennas, a multi-node system may be referred to as a Multiple Input Multiple Output (MIMO) system.

Various transmission schemes may be used in a MIMO system. The transmission scheme refers to a scheme in which a BS transmits downlink data to UE. The MIMO transmission scheme includes a transmit diversity, spatial multiplexing, beamforming, etc. The transmit diversity is technology in which multiple transmit antennas transmit the same data in order to increase transmission reliability. The spatial multiplexing is technology in which multiple transmit antennas transmit different data at the same time in order to transmit data at high speed while not increasing the bandwidth of a system. The beamforming is used to increase the Signal to Interference plus Noise Ratio (SINR) of a signal by applying weight according to a channel state in multiple antennas. Here, the weight may be indicated by a weight vector or a weight matrix, which is called a precoding vector or a precoding matrix.

According to the existing communication standard, a BS informs UE of a cell identifier (ID) through a synchronization signal. For example, in 3GPP LTE, a BS informs UE of a cell ID by transmitting sequences, corresponding to each of two seeds which may form any one of 504 predefined cell IDs, through synchronization signals (a primary synchronization signal and a secondary synchronization signal). In IEEE 802.16m, a BS informs UE of a cell ID through a preamble.

UE receives or transmits a physical layer signal through a variety of physical layer channels by using a cell ID. In downlink, a downlink channel through which the physical layer signal is transmitted may include, for example, a physical broadcast channel (PBCH), a physical downlink control channel (PDCCH), and a physical control format indicator channel (PCFICH). A downlink signal may include, for example, a downlink Reference Signal (RS), a Cell-specific RS (CRS), a Channel State Information-RS (CSI-RS), a Positioning RS (PRS), and a demodulation-RS (DM-RS). The sector 6.10 of 3GPP TS 36.211 (V9.1.0) "Technical Specification; Evolved Universal Terrestrial Radio Access (E-UTRA); Physical Channels and Modulation (Release 9)" may be incorporated herein by reference for downlink RSs. An uplink channel may include a physical uplink control channel (PUCCH). An uplink signal may include an uplink RS and, more particularly, a Sounding RS (SRS) and an uplink DM-RS. The sector 5.5 of 3GPP TS 36.211 (V9.1.0)"Technical Specification; Evolved Universal Terrestrial Radio Access (E-UTRA); Physical Channels and Modulation (Release 9)" may be incorporated herein by reference for uplink RSs. In IEEE 802.16m, the permutation rule of a Distributed Resource Unit (DRU) is determined by a cell ID.

Furthermore, in a multi-node system, it is preferred that the existing communication standard be utilized in terms of backward compatibility and maintenance/repair/management. To this end, in a multi-node system, two kinds of methods may exist regarding how a cell ID is allocated to a node according to what scheme.

The first method is a method in which different cell IDs are assigned to respective nodes connected to a BS so that the nodes transmit signals using the respective cell IDs. The second method is a method in which a common cell ID is assigned to nodes connected to a BS so that all the nodes transmit signals generated using the same cell ID. Here, the common cell ID may be the same cell ID used by the BS.

That is, the first method may be called a method using a multi-node system as a multi-cell system, and the second method may be called a method using a multi-node system as a single cell system.

The first method using a multi-node system as a multi-cell system is advantageous in that it has higher spectral efficiency and UE capacity than the second method. The UE capacity means the number of UEs that may be supported by a system. The first method, however, is disadvantageous in that power consumption of UE may be increased because of an interference problem between multiple cells and frequent movement of UE between cells.

The reason why power consumption of the UE is increased is related to a cell search process. The UE measures a Reference Signal Received Power (RSRP) after awakening from an idle mode in a discontinuous reception (DRX) cycle. In this case, if a difference between a reception power from a serving cell now providing service and a reception power from an interference cell that provides interference is a specific threshold value or less, the UE performs a cell search process of searching for an adjacent cell in order of 1) intra-cell, 2) inter-cell, and 3) Radio Access Technology (RAT).

In the first method, UE must frequently perform the cell search process because multiple cells having a small coverage are densely populated. Consequently, power consumption of UE is increased. An increase of the power consumption is not preferred because UE commonly has a limited battery capacity.

Interference occurring between multiple cells may be overcome by using a variety of cooperative transmission technologies, such as multi-BS MIMO, coordinated multi point transmission/reception (CoMP), and enhanced inter-cell interference coordination (eICIC). However, there are some signals to which the cooperative transmission technology is difficult to apply. For example, the cooperative transmission technology is difficult to apply to a physical layer signal transmitted through a PBCH, a PDCCH, and PCFICH in LTE, a synchronization signal, a preamble in IEEE 802.16m, A-MAP, etc. The signals chiefly transfer essential information, such as system information and control information, to UE. If the density of cells is excessively high, reception performance is reduced owing to inter-cell interference. If an error is generated, system performance may be seriously deteriorated. For this reason, the cooperative transmission technology is difficult to apply to the signals.

In the second method, UE recognizes each node of a multi-node system as the same cell because the node transmits a signal using the same cell ID. Accordingly, a probability that power consumption of UE may not be increased is high because a probability that the UE may perform the cell search process is low. The second method is, however, disadvantageous in that it has low spectral efficiency and UE capacity than the first method.

As described above, each of the two methods has the advantages and disadvantages. There is a need for a new cooperative transmission method capable of utilizing the advantages of each method. To this end, the present invention proposes a single cell-based cooperative transmission method applicable to a multi-node system.

<Single Cell-Based Cooperative Transmission Method>

The outline of the single cell-based cooperative transmission method is first described, and a detailed embodiment thereof is then described in detail.

In a multi-node system, essential information is generated using a common cell ID and is then transmitted and received by all nodes. Here, the essential information refers to, for example, system information, control information, and information related to inter-cell movement (i.e., cell selection/reselection or handover). The essential information is generated using the common cell ID and is then transmitted and received by all the nodes of a multi-node system. For example, in case of downlink, the essential information may be broadcasted by all the nodes. For another example, in case of downlink where the BS controls one high-power node and a plurality of low-power nodes under the coverage of the high-power node, the essential information may be transmitted by the high power node only. In case of uplink, the essential information may be generated by UE using a common cell ID and then transmitted to all the nodes.

Meanwhile, in a multi-node system, each node may have a dedicated cell ID different from a common cell ID. The dedicated cell ID may be a value generated independently from the common cell ID. In another embodiment, the dedicated cell ID may be a value generated according to a specific relationship set up with the common cell ID. For example, the dedicated cell ID of each node may have the same higher M bits (M<N) as a common cell ID formed of N bits. In another embodiment, the dedicated cell ID may be formed of a function of only some of components forming the common cell ID. For example, in LTE, a total of 504 cell IDs exist. The cell IDs are classified into 168 unique cell ID groups, and each of the groups includes 3 cell IDs. Each of the cell IDs is included in one cell ID group. That is, in LTE, the cell ID may be formed like $N_{ID}^{cell}=3\ N_{ID}^{(1)}+N_{ID}^{(2)}$. Here, $N_{ID}^{(1)}$ indicates a cell ID group and may have any one value of 0 to 167. $N_{ID}^{(2)}$ indicates a cell ID within a cell ID group and may have any one value of 0 to 2. $N_{ID}^{(1)}$ and $N_{ID}^{(2)}$ may be called seed numbers for cell IDs. In this case, $N_{ID}^{(1)}$ may be represented by 8 bits, and $N_{ID}^{(2)}$ may be represented by 2 bits. Here, a dedicated cell ID may be defined to have the same bits as some of the $N_{ID}^{(1)}$ and/or $N_{ID}^{(2)}$. For example, the dedicated cell ID may be defined so that it is generated by using the same $N_{ID}^{(1)}$ as the common cell ID. The dedicated cell ID may be distinguished from the common cell ID by using a different $N_{ID}^{(2)}$ from the common cell ID. In another embodiment, the dedicated cell ID may be generated by using the same $N_{ID}^{(2)}$ as the common cell ID, but may be generated by using the same bits as only some bits of $N_{ID}^{(1)}$.

The dedicated cell ID may replace the common cell ID when a pilot signal or a signal transmitted through a channel other than the PBCH, the PDCCH, and the PCFICH is generated and transmitted. A pilot signal (or a reference signal) may include, for example, a CSI-RS, a DM-RS (or UE-specific RS), a PRS, and a midamble.

A BS may perform cooperative transmission to UE by using at least one node. In this case, the BS may inform the UE of a dedicated cell ID for a node which participates in the cooperative transmission (this is called a cooperative node).

If each node transmits a synchronization signal or a preamble generated using a common cell ID, UE recognizes the node as a single cell which has the common cell ID as a cell ID. If each node transmits a signal using a dedicated cell ID, UE recognizes the node as an additional cell different from a serving cell. As described above, each node is called a virtual cell because it is not identical with a conventional cell, but it may perform some functions of a cell. A BS may perform cooperative transmission to specific UE by using a node (i.e., a virtual cell).

A detailed embodiment of the single cell-based cooperative transmission method is described below.

Figure 2:
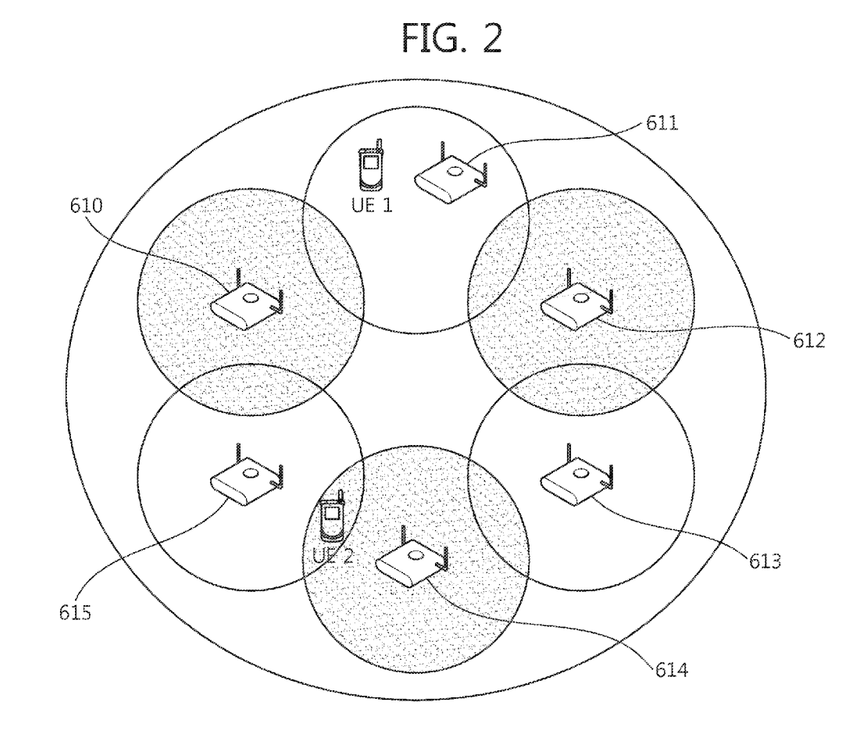
FIG. 2 shows a multi-node system employing a single cell-based cooperative transmission method.

FIG. 2 shows a multi-node system employing the single cell-based cooperative transmission method.

Referring to FIG. 2, the multi-node system may include a plurality of nodes, for example, a node 1 to a node 6 610 to 615. The nodes are connected to a BS and may be controlled by the BS. The node 1 to the node 6 610 to 615 may be sequentially called a virtual cell 1 to a virtual cell 6. The nodes may use a common cell ID when transmitting and receiving essential information to and from UE, but may use independent dedicated cell IDs in some signals or channels. As described above, the common cell ID is used when system information, control information, and signals related to the handover and cell search process of UE are transmitted. For example, when a synchronization signal or a signal transmitted through a PBCH is transmitted, each node uses the common cell ID. On the other hand, when signals other than the essential information are transmitted to specific UE, each node may use its dedicated cell ID. The dedicated cell ID can be used when generating some uplink signals at UE side as well as downlink signals at each node. The dedicated cell ID used for uplink signal generation can be signaled to UE.

As described above, if the multi-node system is operated according to the single cell-based cooperative transmission method, UE identifies cells by using a common cell ID which is in common used by the node 1 to the node 6 or a dedicated cell ID. When UE receives essential information generated based on a common cell ID, the UE recognizes a serving cell as a cell having the common cell ID. In this case, when a specific node transmits a signal generated using a dedicated cell ID, the UE may recognize the specific node as a separate cell. If the signal is for the UE, the UE may recognize the specific node as a cooperative cell.

For cooperative transmission, a virtual cell (i.e., a node) may be utilized as follows.

1. Method A: Method of Enabling UE to Recognize Virtual Cells as a Different Cell Other than a Mother Cell, if Necessary.

Figure 3:
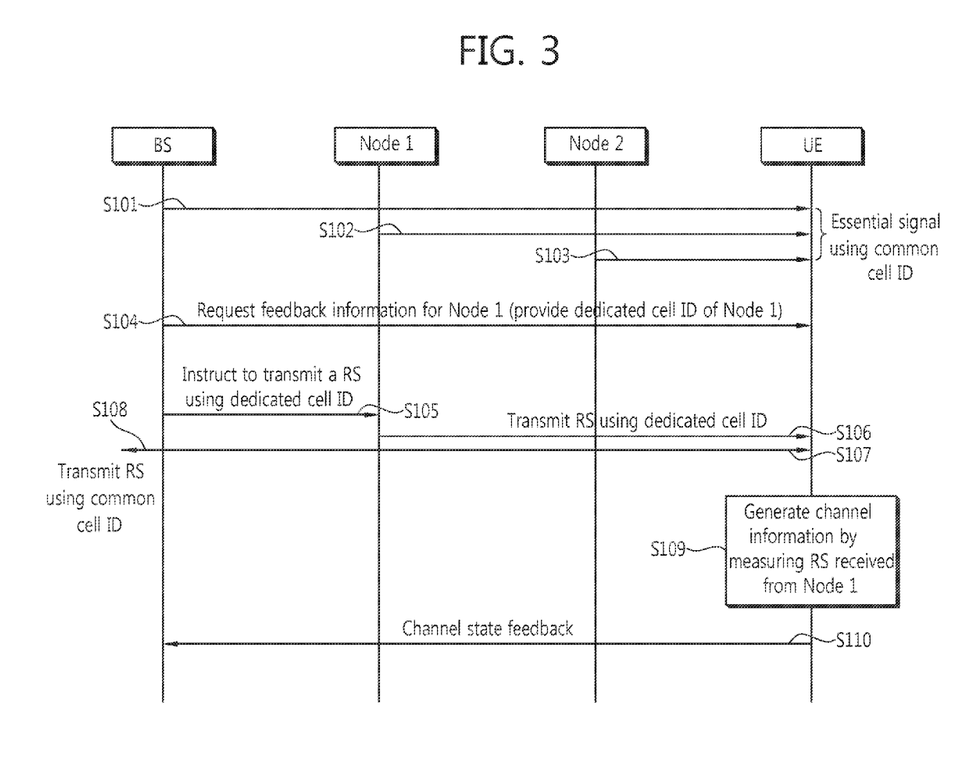
FIG. 3 shows a process according to a method A.

FIG. 3 shows a process according to the method A.

Referring to FIG. 3, it is assumed that a multi-node system includes a BS, a node 1, and a node 2. The node 1 and the node 2 may be connected to the BS and controlled by the BS.

The BS, the node 1, and the node 2 transmit essential signals, generated using a common cell ID, to UE (S101, S102, S103). The UE does not recognize the node 1 and the node 2 as virtual cells within a cell, but recognizes them as a single cell and operates using the essential signals. That is, the UE is operated using system information, control information, and signals related to cell selection, reselection, and handover, as if it is operated within a single cell.

If it is necessary to perform a single cell-based cooperative transmission operation on the UE, the BS may request a channel information feedback for virtual cells that may participate in the single cell-based cooperative transmission operation (hereinafter referred to as candidate cooperative cells) from the UE (S104). The BS may provide dedicated cell IDs for the virtual cells (i.e., the candidate cooperative cells), while requesting the channel information feedback for the candidate cooperative cells. For example, if the candidate cooperative cell is the node 1, the BS may request the channel information feedback for the node 1 from the UE and, at the same time, provide the dedicated cell ID for the node 1. In FIG. 3, one node is illustrated to be the candidate cooperative cell, but not limited thereto. That is, a plurality of nodes may become candidate cooperative cells. In this case, a BS may request a channel information feedback for the plurality of nodes and, at the same time, provide dedicated cell IDs for the plurality of nodes.

The BS instructs the node 1 (i.e., the candidate cooperative cell) to transmit a reference signal (i.e., a pilot signal) using the dedicated cell ID (S105). The reference signal using the dedicated cell ID may be, for example, a CSI-RS, a DM-RS, a PRS, or a midamble which is generated using the dedicated cell ID instead of the common cell ID.

The node 1 (i.e., the candidate cooperative cell) transmits the reference signal using the dedicated cell ID (S106). At this time, the node 1 and the BS may also transmit a reference signal generated using the common cell ID, for legacy UE (S107, S108). That is, the BS and the node 1 may transmit and receive a reference signal, generated using different cell IDs, through the same carrier.

The UE generates channel information by measuring the reference signal received from the node 1 (S109) and feeds the channel information back to the BS (S110). The channel information indicates the state of a channel between the node 1 and the UE and may include a Channel Quality Indicator (CQI), a Precoding Matrix Index (PMI), and a Rank Indicator (RI).

The channel information fed back by the UE is transferred to the BS via a specific node (the node 1, in this example) or directly. A feedback channel through which the channel information is fed back may be constructed using the common cell ID, but may be constructed using the dedicated cell ID of a specific node if the channel information is transferred through the specific node. The feedback channel through which the channel information is fed back to the BS may refer to a Physical Uplink Control Channel (PUCCH) and a Physical Uplink Shared Channel (PUSCH) in LTE. The dedicated cell ID may be used for the generation of some uplink reference signals such as sounding reference signal (SRS) and uplink DM-RS as well as uplink physical channels.

The BS may perform cooperative transmission by determining which one of the virtual cells (i.e., the candidate cooperative cells) will be operated as a cooperative cell, whether to use what precoding matrix, etc. by using the feedback channel information.

In this method, an example where the BS has an additional transmit antenna has been described, but the BS may not have an additional transmit antenna. In this case, the signal transmitted by the BS at step S101 may be omitted, and the signal transmitted by the BS at steps S104 and S108 may be transmitted through all the nodes connected to the BS or a specific node.

2. Method B: Method of Informing UE of Information about Virtual Cells so that the UE Selects and Uses a Common Cell ID or a Dedicated Cell ID when Transmitting and Receiving a Signal FIG. 4 shows a process according to the method B.

Figure 4:
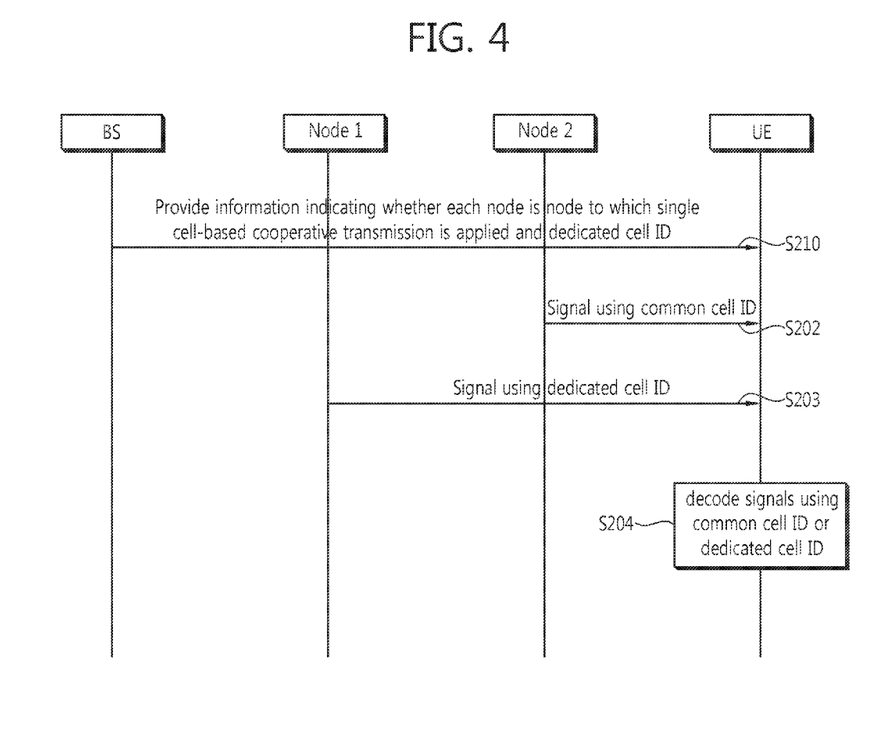
FIG. 4 shows a process according to a method B.

Referring to FIG. 4, a BS provides UE with information, indicating whether each of nodes 1 and 2 is a virtual cell operated according to the single cell-based cooperative transmission method, and a dedicated cell ID (S201). The information is hereinafter referred to as a cooperative transmission triggering message. The cooperative transmission triggering message may be included in higher layer signal (e.g., a System Information Block (SIB) of an RRC message) and provided or may be included in Downlink Control Information (DCI) transmitted through a PDCCH as UE-specific control information and provided.

The dedicated cell ID for the virtual cell may be provided as a higher layer signal, such as an RRC message, or may be included in DCI and explicitly provided. In another embodiment, the dedicated cell ID for the virtual cell may be implicitly provided through a new synchronization signal or a reference signal which is generated using the dedicated cell ID.

FIG. 4 shows an example where the node 1 is a virtual cell operated according to the single cell-based cooperative transmission method. In this case, the node 2 transmits a signal using a common cell ID (S202), and the node 1 transmits a signal using the dedicated cell ID (S203). At step S202, both the node 2 and the node 1 also may transmit signals using the common cell ID.

The UE can know that signals in respective channels have to be transmitted and received by using what cell ID on the basis of the cooperative transmission triggering message and the dedicated cell ID for the virtual cell. The UE decodes the received signals by using the common cell ID or the dedicated cell ID (S204). The signal using the dedicated cell ID may be, for example, a CSI-RS, a PRS, a midamble, a DM-RS, a PDSCH, a PUSCH, a SRS, or a data burst.

A signal that must be signalized by a BS according to an operating method of virtual cells participating in single cell-based cooperative transmission and an operating method of UE are described below.

In general, if a serving cell and cooperative cells perform cooperative transmission, the cooperative cells may be operated according to either a Joint Transmission (JT) method or a Coordinated Beamforming (CB) method.

1) The joint transmission method is a cooperative transmission method in which a serving cell and a cooperative cell transmit signals to the same UE at the same time according to proper scheduling. For the joint transmission method, UE must feed channel information (e.g., a CQI), corresponding to a case where the serving cell and the cooperative cell transmit signals through the same radio resources, back to a BS.

To this end, when the BS informs the UE of information about the cooperative cell, the UE receives and measures the reference signal (pilot) of the cooperative cell. Furthermore, the UE receives and measures the reference signal of the serving cell. In this process, the BS may exclude radio resources through which the reference signal of the cooperative cell is transmitted when the serving cell transmits a signal.

The UE feeds one CQI back to the BS by using a result of the measured reference signal for the serving cell and the cooperative cell, assuming that the serving cell and the cooperative cell have transmitted signals using the same radio resources at the same time.

If a multi-node system is operated according to the single cell-based cooperative transmission method, however, a method different from the existing channel information feedback method may be necessary.

Figure 5:
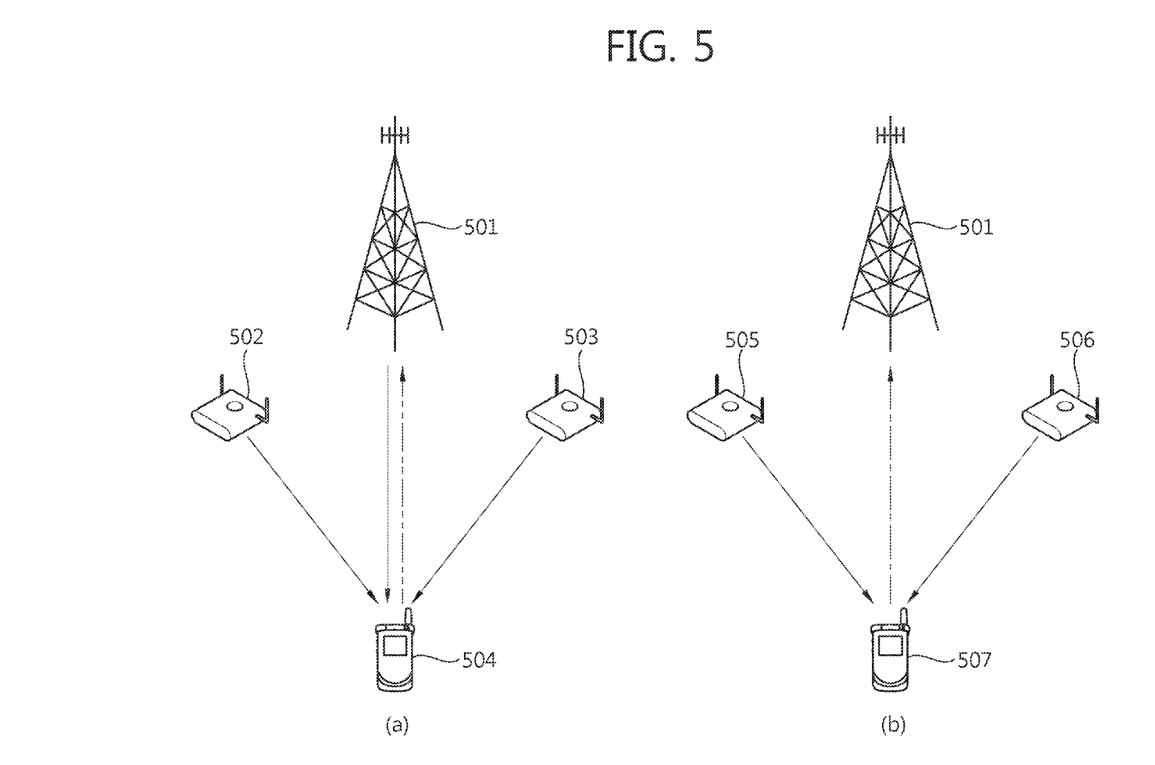
FIG. 5 shows a channel information feedback method according to an embodiment of the present invention.

FIG. 5 shows a channel information feedback method according to an embodiment of the present invention.

Referring to FIG. 5(a), a BS 501 may provide a serving cell, a node 1 502 may provide a virtual cell 1, and a node 2 503 may provide a virtual cell 2. In this case, the BS, and the node 1 and the node 2 may participate in cooperative transmission according to the joint transmission method. Here, the node 1 and the node 2 become cooperative cells. In this case, UE 504 may compute a CQI and feed the computed CQI back to the BS 501, assuming that the serving cell and the cooperative cells transmit signals at the same time, as in the existing method.

Referring to FIG. 5(b), a BS 502 may not participate in cooperative transmission, but only a node 1 505 and a node 2 506 may participate in cooperative transmission. In other words, unlike in FIG. 5(a), the BS 502 may not transmit a signal to UE 507, and only the node 1 505 and the node 2 506 may perform cooperative transmission in such a way as to transmit signals to the UE 507.

In cooperative transmission between BSs (i.e., cooperative transmission between a serving BS and an adjacent BS), the serving BS always participates in cooperative transmission. In a multi-node system operated according to the single cell cooperative transmission method, a BS may not participate in cooperative transmission. If each node transmits essential information using a common cell ID, however, it is problematic because UE may recognize that a BS participates in cooperative transmission as a serving cell. In this case, if the UE computes a CQI and feeds the computed CQI back to the BS assuming that the serving cell and cooperative cells transmit signals at the same time, an error may occur in the cooperative transmission scheduling of the BS.

In order to prevent this problem, if the serving cell does not participate in cooperative transmission as shown in FIG. 5(b), the UE must compute a CQI and feed the computed CQI back to the BS, assuming that only the cooperative cells transmit signals. In other words, in a multi-node system operated according to the single cell-based cooperative transmission method, signaling of information for distinguishing two kinds of cooperative transmission methods, such as those shown in FIGS. 5(a) and (b), from each other is necessary because the two kinds of cooperative transmission methods may be used at the time of the joint transmission method.

To this end, when the BS requests a channel information feedback from the UE, the BS may transmit a message, indicating what kind of a CQI must be fed back, to the UE. The message may be, for example, an indicator of 1 bit. The UE may know that a CQI corresponding to which one of the cooperative transmission methods shown in FIGS. 5(a) and (b) must be fed back on the basis of a value of the indicator.

In another embodiment, if a node is a node to which the single cell-based cooperative transmission method is applied, rules may be previously prescribed so that a CQI must be fed back, assuming that only cooperative cells other than a serving cell transmits a signal.

In another embodiment, BS may signal all cell IDs corresponding to the cooperating nodes to UE. If the serving cell participates in the cooperative transmission as FIG. 5(a), the cell ID of serving cell or the common cell ID can be included in the signaled list of cell IDs. Otherwise, the cell ID of serving cell or the common cell ID can be excluded in the list.

2) If a serving cell and cooperative cells perform cooperative transmission, the cooperative cells may perform cooperative transmission according to the coordinated beamforming method. The coordinated beamforming method is a method in which any one of a serving cell and cooperative cells transmit signals to UE according to scheduling. For example, if a serving cell and cooperative cells perform cooperative transmission according to the coordinated beamforming method, the serving cell may transmit a signal to UE 1 and the cooperative cells may transmit signals to UE 2. Here, the signals transmitted from the cooperative cells to the UE 2 may function as interference with the UE 1. In order to prevent this problem, in this method, the cooperative cells or the serving cell transmits signals by using a proper precoding matrix in order to improve the reception of a signal by the UE 1.

For the coordinated beamforming method, UE may feed the PMI of a cooperative cell for maximizing or minimizing interference and a CQI at that time back to a serving cell. This existing feedback method may have to be modified in the single cell-based cooperative transmission method.

Figure 6:
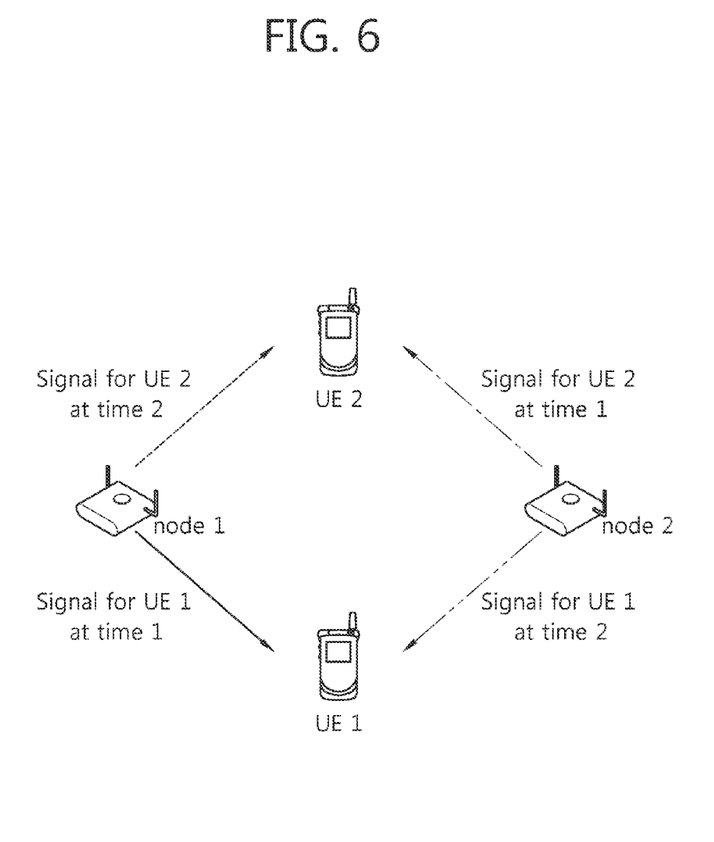
FIG. 6 shows an example in which cooperative transmission is performed according to a coordinated beamforming method.

FIG. 6 shows an example in which cooperative transmission is performed according to the coordinated beamforming method. As in FIG. 5(b), it is assumed that a BS does not participate in cooperative transmission.

Referring to FIG. 6, at a time 1, a node 1 transmits a signal for UE 1, and a node 2 transmits a signal for UE 2. At a time 2, the node 1 transmits a signal for the UE 2, and the node 2 transmits a signal for the UE 1. In this case, at the time 1, the node 1 may be a serving cell for the UE 1, and the node 2 may be a serving cell for the UE 2. At the time 2, the node 1 may be a serving cell for the UE 2, and the node 2 may be a serving cell for the UE 1.

As described above, each node within a multi-node system may be operated not only as a cooperative cell, but also as a serving cell. Accordingly, when a multi-node system is operated according to the single cell-based cooperative transmission method, a BS has to provide information about which one of cooperative cells participating in cooperative transmission transmits a signal to UE and which one thereof influences the UE.

In other words, a BS has to provide the UE 1 with information about that the node 1 is a cooperative cell transmitting a signal for the UE 1 and the node 2 is a cell interfering with the UE 1 at the time 1. For example, the BS may inform the UE whether a cooperative cell is operated as a serving cell or an interference cell by adding a flag of 1 bit to a higher layer signal or a physical layer signal when informing information about the cooperative cell through the higher layer signal or the physical layer signal.

Accordingly, the UE 1 can know that the node 1 and the node 2 are not simple cooperative cells, but the node 1 transmits the signal for the UE 1 and the node 2 transmits the interference signal for the UE 1 at the time 1. In this case, the UE 1 may compute a PMI and a CQI based on the information and feed the computed PMI and CQI back to the BS. The BS may schedule cooperative transmission according to the coordinated beamforming method on the basis of the feedback channel information.

Figure 7:
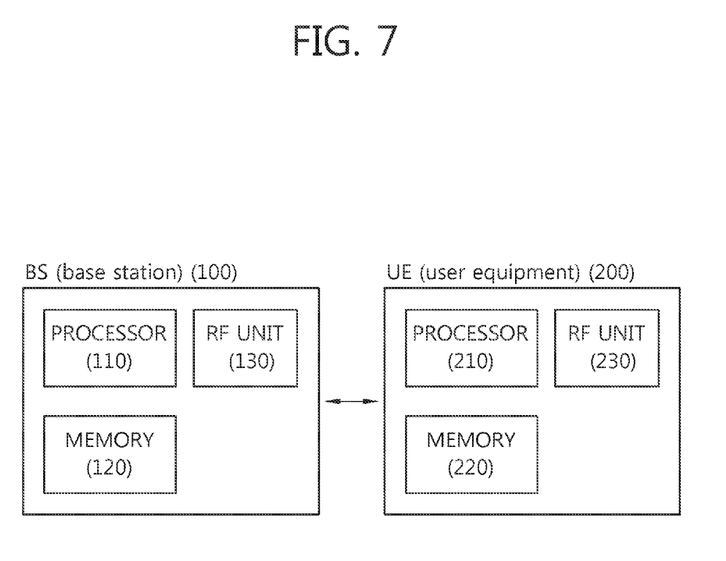
FIG. 7 is a block diagram showing a base station and user equipment.

FIG. 7 is a block diagram showing a BS and UE.

The BS 100 includes a processor 110, memory 120, and a Radio Frequency (RF) unit 130. The processor 110 implements the proposed functions, processes, methods, or all of them. More particularly, the processor 110 controls a plurality of nodes so that the nodes transmit signals generated using a common cell ID and at least one of a plurality of nodes transmits a signal generated using a dedicated cell ID. Furthermore, the processor 110 transmits a signal to request a channel information feedback between a node, transmitting a signal generated using a dedicated cell ID, and UE from the UE and schedules cooperative transmission on the basis of the feedback information.

The memory 120 is coupled to the processor 110 and configures to store various pieces of information for driving the processor 110. The RF unit 130 is coupled to the processor 110 and configured to transmit or receive a radio signal.

The UE 200 includes a processor 210, memory 220, and an RF unit 230. The processor 210 receives signals, generated using a common cell ID, from a plurality of nodes and also receives a signal to request a channel information feedback between a node, transmitting a signal generated using a dedicated cell ID, and information indicating the node from the a BS. The processor 210 receives a signal generated using a dedicated cell ID and feeds measured channel information back to the BS. The memory 220 is coupled to the processor 210 and stores various pieces of information for driving the processor 210. The RF unit 230 is coupled to the processor 210 and transmits or receives a radio signal.

The processor 110, 210 may include Application-Specific Integrated Circuits (ASICs), other chipsets, logic circuits, and/or data processors. The memory 120, 220 may include Read-Only Memory (ROM), Random Access Memory (RAM), flash memory, memory cards, storage media and/or other storage devices. The RF unit 130, 230 may include one or more antennas for transmitting or receiving a radio signal. When the embodiment is implemented in software, the above scheme may be implemented using a module (process or function) for performing the above function. The module may be stored in the memory 120, 220 and executed by the processor 110, 210. The memory 120, 220 may be placed inside or outside the processor 110, 210 and may be functionally coupled to the processor 110, 210 by a variety of well-known means.

There are provided a method and apparatus in which each node operates as a plurality of virtual cells within a single cell and thus performs single cell-based cooperative transmission in a multi-node system. According to the present invention, UE can reduce power consumption due to a frequent handover between cells and receive a signal according to cooperative transmission, while reducing inter-cell interference, in a multi-node system. Furthermore, according to the present invention, the throughput of a multi-node system and the number of supportable UEs (i.e., UE capacity) can be increased.

The present invention may be implemented using hardware, software, or a combination of them. In hardware implementations, the present invention may be implemented using Application Specific Integrated Circuits (ASICs), Digital Signal Processors (DSPs), Programmable Logic Devices (PLDs), Field Programmable Gate Arrays (FPGAs), processors, controllers, microprocessors, other electronic units, or a combination of them, which are designed to perform the above function. In software implementations, the present invention may be implemented using a module performing the above function. The software may be stored in the memory and executed by the processor. The memory or the processor may adopt various means well known to those skilled in the art.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a reference signal, performed by a base station, in a wireless communication system, the method comprising:
   transmitting synchronization signals to a user equipment (UE); and
   transmitting either a first reference signal generated based on a first identifier or a second reference signal generated based on a second identifier,
   wherein the first identifier is a cell identity which is provided by the synchronization signals and the second identifier is a virtual identity which is provided by a radio resource control (RRC) message,
   wherein the first identifier and the second identifier have a same range of values,
   wherein only the first reference signal, among the first reference signal and the second reference signal, is transmitted if the second identifier has not been provided for the UE, and
   wherein only the second reference signal, among the first reference signal and the second reference signal, is transmitted if the second identifier has been provided for the UE.

2. The method of claim 1, wherein a number of candidates for the first identifier and a number of candidates for the second identifier are same.

3. The method of claim 1, wherein the first identifier is any one value among 504 values.

4. The method of claim 3, wherein the second identifier is any one value among 504 values.

5. The method of claim 1, wherein the synchronization signals comprise a primary synchronization signal and a secondary synchronization signal.

6. The method of claim 1, wherein the first or second reference signal is a demodulation-reference signal (DM-RS) for demodulating data.

7. A base station (BS), the BS comprising:
   a Radio Frequency (RF) unit configured to transmit and receive a radio signal; and
   a processor coupled to the RF unit,
   wherein the processor is configured to:
   transmit synchronization signals to a user equipment (UE), and
   transmit either a first reference signal generated based on a first identifier or a second reference signal generated based on a second identifier,
   wherein the first identifier is a cell identity which is provided by the synchronization signals and the second identifier is a virtual identity which is provided by a radio resource control (RRC) message,
   wherein the first identifier and the second identifier have a same range of values,
   wherein only the first reference signal, among the first reference signal and the second reference signal, is transmitted if the second identifier has not been provided for the UE,
   wherein only the second reference signal, among the first reference signal and the second reference signal is transmitted if the second identifier has been provided for the UE.

8. The BS of claim 7, wherein a number of candidates for the first identifier and a number of candidates for the second identifier are same.

9. The BS of claim 7, wherein the first identifier is any one value among 504 values.

10. The BS of claim 9, wherein the second identifier is any one value among 504 values.

11. The BS of claim 7, wherein the synchronization signals comprise a primary synchronization signal and a secondary synchronization signal.

12. The BS of claim 7, wherein the first or second reference signal is a demodulation-reference signal (DM-RS) for demodulating data.

* * * * *